United States Patent
Singhal

(10) Patent No.: US 10,334,096 B2
(45) Date of Patent: *Jun. 25, 2019

(54) APPARATUS AND METHOD FOR VEHICLE SAFETY FOR HANDS FREE SMS CAPABILITY IN A MOVING VEHICLE

(71) Applicant: Tara Chand Singhal, Torrance, CA (US)

(72) Inventor: Tara Chand Singhal, Torrance, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/132,349

(22) Filed: Apr. 19, 2016

(65) Prior Publication Data

US 2016/0234377 A1 Aug. 11, 2016

Related U.S. Application Data

(63) Continuation of application No. 14/106,966, filed on Dec. 16, 2013, now Pat. No. 9,357,361.

(60) Provisional application No. 61/869,739, filed on Aug. 25, 2013, provisional application No. 61/887,415, filed on Oct. 6, 2013.

(51) Int. Cl.
*H04M 1/725* (2006.01)
*H04W 4/14* (2009.01)
*G10L 15/26* (2006.01)
*H04M 1/60* (2006.01)
*H04W 4/80* (2018.01)

(52) U.S. Cl.
CPC ......... *H04M 1/72577* (2013.01); *G10L 15/26* (2013.01); *H04M 1/6083* (2013.01); *H04W 4/14* (2013.01); *H04W 4/80* (2018.02); *H04M 1/72522* (2013.01); *H04M 1/72552* (2013.01)

(58) Field of Classification Search
CPC .......... H04M 1/72577; H04M 1/6083; H04M 1/72552; H04M 1/72522; H04W 4/14; H04W 4/80; G10L 15/26
See application file for complete search history.

(56) References Cited

U.S. PATENT DOCUMENTS

| | | | |
|---|---|---|---|
| 2011/0065375 A1* | 3/2011 | Bradley | H04M 1/72577 455/1 |
| 2011/0265003 A1* | 10/2011 | Schubert | G06F 9/4445 715/716 |
| 2012/0123908 A1* | 5/2012 | Eich | B60R 25/241 705/27.1 |
| 2013/0316737 A1* | 11/2013 | Guba | G08G 1/20 455/456.4 |
| 2014/0100740 A1* | 4/2014 | Chutorash | G01C 21/3661 701/36 |
| 2014/0357248 A1* | 12/2014 | Tonshal | H04M 1/6091 455/418 |
| 2014/0364108 A1* | 12/2014 | Tibbitts | H04W 48/04 455/419 |

* cited by examiner

*Primary Examiner* — Wayne H Cai
(74) *Attorney, Agent, or Firm* — Steve Roeder, Esq.

(57) ABSTRACT

A vehicle safety function is installed and operative in the vehicle electronics. The vehicle function is implemented via a texting-safety logic inside the vehicle electronics. The texting-safety logic when the vehicle exceeds a threshold speed outputs an RF signal with a texting-safety code. The texting-safety code is picked up by a smart phone in the vehicle to alert the driver about the danger of texting and/or disable the texting feature in the phone while the vehicle is being driven.

20 Claims, 13 Drawing Sheets

Industry Safety Code 16B
From smart phone 13 to vehicle electronics 14

Data Packet
Header

Data
(i) a code that indicates the nature and source of the safety code, among other safety codes,
(ii) a partial or complete smart phone id,
(iii) a flag if the SMS feature is activated, and
(iv) An SMS is received.

Figure 1C

At step 100, receiving SMS in smart phone 13

At step 102, creating by Logic 56A send protocol with sender ID

At step 104, sending via Send protocol audio alert via I/F

At step 106, receiving SMS alert with sender id

At step 108, outputting audio alert with sender id

At step 110, inputting by a user End or Listen command

At step 112, receiving by the phone logic End/Listen command.

At step 114, If listen command

At step 116, performing text to speech conversion of SMS

At step 118, sending audio via Vehicle I/F, If user inputs listen command, await audio from smart phone At step 120, receiving audio by the vehicle electronics and storing the audio clip.

At step 122, outputting audio by vehicle electronics to car audio system

At step 124, receiving from User input optional Reply command

At step 126, forming a SMS reply and wait for text input

At step 128, speaking by user reply & speaks and Say End Logic, logic 58A receive audio input and store At step 130, sending audio by vehicle electronics to smart phone At step 132, receiving audio by the smart phone and temporarily storing it.

At step 134, performing by smart phone speech to text conversion

At step 136, inputting text for sending SMS reply

At step 138, sending confirm by smart phone to vehicle

At step 140, annunciating confirm by vehicle audio

Figure 6A

At step 142, receiving by vehicle spoken SMS Send Advisory
At step 144, receive by vehicle SMS Send Alert
At step 146, selecting by user SMS Destination ID
At step 148, receive by vehicle SMS destination
At step 150, forming in smart phone SMS send record
At step 152, receiving by vehicle spoken SMS text
At step 154, storing by vehicle speech
At step 156, sending by vehicle to smart phone speech record
At step 158, receiving by smart phone SMS speech clip
At step 160, performing by smart phone speech to text conversion
At step 162, entering by smart phone text in SMS
At step 164, sending by smart phone the SMS
At step 166, sending by smart phone to vehicle, Send Confirm
At step 168 receiving by vehicle and annunciating SMS send confirm

Figure 6B

APPARATUS AND METHOD FOR VEHICLE SAFETY FOR HANDS FREE SMS CAPABILITY IN A MOVING VEHICLE

CROSS REFERENCE

This is a continuation application of and claims priority from application Ser. No. 14/106,966 filed Dec. 16, 2013, titled "Apparatus and Method for Vehicle Safety for Hands Free SMS Capability in a Moving Vehicle" of Tara Chand Singhal.

The above referenced application Ser. No. 14/106,966 claims priority from Provisional Application Ser. No. 61/869,739 filed Aug. 25, 2013 of Tara Chand Singhal, titled "Apparatus for Vehicle Safety That Prevents Phone Use in Texting Mode by the Vehicle Driver in a Moving Vehicle," and Provisional Application Ser. No. 61/887,415 filed Oct. 6, 2013 of Tara Chand Singhal, titled "Apparatus and Method for Vehicle Safety Disables SMS or Provides Hands Free SMS Capability in a Moving Vehicle."

applications Ser. No. 14/106,966, 61/869,739, and 61/887,415 are incorporated in their entirety herein by this reference.

FIELD OF THE INVENTION

The embodiments relate to improvements in vehicle safety that enables hands and eyes free SMS capability in a moving vehicle.

BACKGROUND

Now-a-days texting using smart phones, also known as messaging using short messaging system (SMS) protocol is being used. With younger generation of users, using SMS has become very popular based on many published news items; texting presents a safety problem as many people use texting while driving. Using texting by a driver while driving requires the driver to divert his/her attention off the road as well as take either one or both hands off the steering wheel.

Many states in the US have passed laws to prevent phone use while driving and also prevent use of texting while driving. The smart phone manufacturers, cellular telephone companies as well as and the vehicle industry have engaged in an educational effort to warn drivers of the danger of texting and driving.

However, it may be difficult to universally change the behavior of young people and educational effort alone may not be sufficient. Use of a smart phone in the personal possession of young people creates a temptation to use them that is very hard to resist. Young people are careless and do texting while driving presenting a great danger of accidents on the road.

It is an objective of the embodiments herein to provide for a technology solution to prevent texting while driving that will eliminate, it is believed risk of drivers texting while driving. It is yet another objective of the embodiments to enable a hands-free and eyes-free texting while driving a vehicle thus enabling safe use of texting.

SUMMARY

The embodiments herein relate to improvements in vehicle safety that disables use of texting in a cell phone inside the vehicle while the vehicle is being driven or moving. In the specification the word cell phone is used interchangeably with the word smart phone as they are meant to indicate a wireless mobile communication device capable of sending and receiving messages. An alternative embodiment provides for hands-free and eyes-free use of short messaging system (SMS) features of a smart phone or texting in a moving vehicle.

It should be noted by those skilled in the art that other modes of phone use such as searching on the Web as an example also requires a driver to take his/her attention off the road. Hence the embodiments described herein are or may be made equally applicable to these other modes of smart phone use.

It should also be understood by those skilled in the arts that use of SMS herein does not exclude other similar protocols that are used now or may be developed or used in the future.

In one embodiment, a vehicle safety function is installed and operative in a part of the vehicle electronics. The vehicle safety function is implemented via a safe-texting-safety logic inside the vehicle electronics. The safe-texting-safety logic when the vehicle exceeds a threshold speed outputs a short distance RF signal with a texting-safety digital code.

The texting-safety digital code is picked up by a phone-logic inside the smart phone that is inside the vehicle to alert the driver about the danger of texting and/or disable the texting feature in the phone while the vehicle is being driven.

In an alternative embodiment, these two logics, phone-logic and safe-texting-safety logic inside the vehicle electronics have features that provide for a hands and eyes free use of SMS or texting, while the vehicle is being driven. In some modes of use, both of these embodiments may be used together depending upon the settings and preferences of drivers or their guardians/parents for younger drivers.

These two logics, the vehicle safe-texting-safety logic and the phone-logic work with each other in a vehicle safety system that prevents texting while driving by the driver of the vehicle or enables hands-free and eyes-free texting mode.

These and other aspects of the embodiments herein are described in detail with the help of the accompanying drawings and the description, where similar number are used to identify similar features of the embodiments.

BRIEF DESCRIPTION OF THE DRAWINGS

Some of the novel features of the embodiments will be best understood from the accompanying drawings, taken in conjunction with the accompanying description, in which similar reference characters refer to similar parts, and in which:

FIGS. 1A, 1B and 1C are block diagrams of an embodiment of a vehicle safety system 10.

FIGS. 6A and 6B are method diagram of an embodiment of a vehicle function that is used with the vehicle safety system in embodiment 12.

DESCRIPTION

Introduction

Figure 1A:
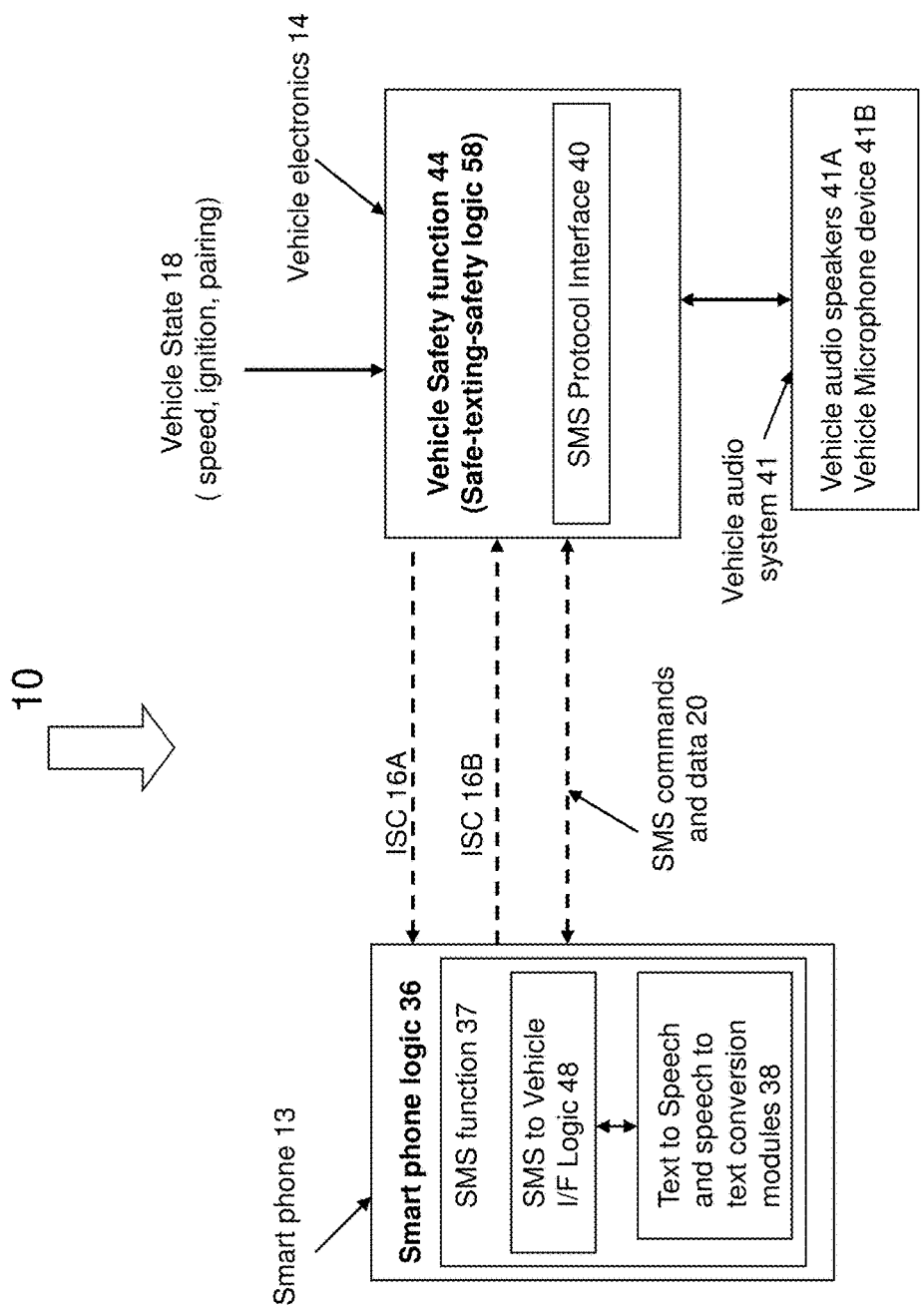
Figure 1B:
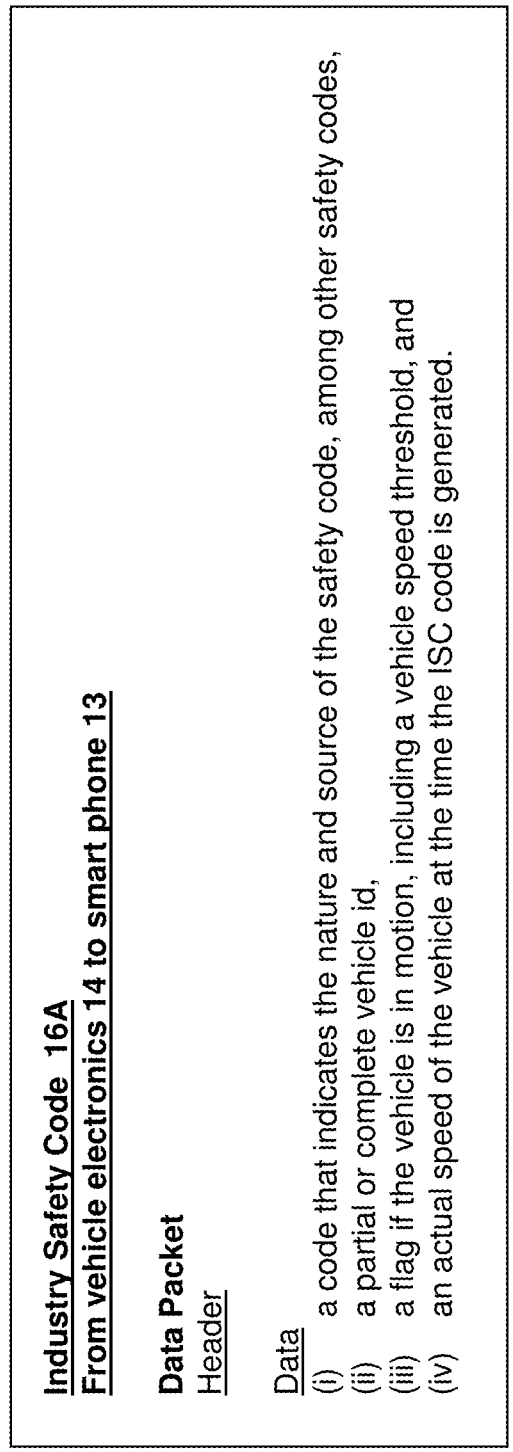

With reference to FIGS. 1A, 1B, and 1C, basic features of a vehicle safety system 10 are illustrated. The system 10 has a smart phone 13 with a smart phone logic 36 and vehicle electronics 14 with a vehicle safety function 44 that performs the logic of safe-texting logic. The function 44 in the vehicle electronics 14 sends a digital code 16A to the smart phone logic 36. The logic 36 in the smart phone 13 may also send digital code 16B to the logic 44 in the vehicle electronics 14.

The industry safety digital code 16A is used to convey to the logic 36 of the smart phone 13, the state of the vehicle that would require entry of a safe-texting mode of operation in the smart phone 13. The digital code 16B is used to convey to the logic 44 in the vehicle electronics 14, the state of the smart phone for having used or intend to use SMS feature of the smart phone 13. These codes 16A and 16B are described herein with reference to FIGS. 1B and 1C.

The function 44 is being input a vehicle state 18. The vehicle state 18 includes a status of pairing of vehicle electronics 14 with the smart phone 13, a vehicle speed, and a vehicle ignition state.

The logic 36 has a SMS function 37 that works in conjunction with a text to speech and a speech to text conversion module 38 and SMS to vehicle interface logic 48. The interface 40 in vehicle electronics 14 provides protocol for communication of commands and data 20 between the SMS function 37 and vehicle safety function 44.

The vehicle safety function 44 also provides for interface with the vehicle audio system 41 to send audio output to audio system 41 A and receive driver voice input via microphone device 41B. The vehicle safety function 44 provides a SMS protocol interface function 40 for interfacing with SMS protocol interface 48 in the smart phone 13.

There are two different embodiments 11 and 12 that are described. Embodiment 11 is illustrated with the help of FIGS. 1C, 2A, 2B, and 2C.

Embodiment 11 uses safety logic in the smart phone and the vehicle electronics and disables SMS mode in the smart phone when the vehicle is in motion.

Embodiment 12 is illustrated with the help of FIGS. 1B, 3A, 3B, 4A, 4B, 5 and 6A and 6B. Embodiment 12 uses a different approach to solve the same problem by providing hands-free and eyes-free SMS capability while the driver is in the vehicle. Embodiment 12 has two sub-embodiments identified as embodiment 12A and embodiment 12B.

Embodiment 12A becomes operational when the driver with the smart phone is in the vehicle and the phone and the vehicle are paired. Embodiment 12B becomes operational only when the vehicle is in motion.

That is, in embodiment 12B, when the driver is in the vehicle but the vehicle is not moving the hands free SMS function of embodiment 12B is not operational and embodiment 12B becomes immediately operational when the vehicle is in motion.

Which of these embodiments may be used would depend on how the vehicle manufacturers implement the vehicle safety function 44 in vehicle electronics 14 and how the smart phone manufacturers implement the phone-logic 36 in the smart phone 13 and the preference of the drivers. In some modes of use both of these embodiments may be used together depending upon the settings and preferences of drivers or their parents for younger drivers.

These two logics, the vehicle safety function 44 and the phone-logic 36 work with each other in a vehicle safety system 10 that prevents texting while driving by the driver of the vehicle or enables hands-free and eyes-free texting mode.

These and other aspects of the embodiments are described herein where the headings are provided for reader convenience.

Industry Safety Code (ISC) 16A and 16B

As illustrated in FIGS. 1B and 1C, there may be two different digital codes 16A and 16B that may be used. ISC 16A and 16B are preferably digital codes that embed a data structure. As illustrated in FIG. 1B, code 16A may be used to convey data from the vehicle electronics 14 to the smart phone 13 and as illustrated in FIG. 1C, the code 16B may be used to convey data from the smart phone 13 to the vehicle electronics 14.

As illustrated in FIG. 1B, the ISC data structure 16A has a header part and a data part. Prior art teaches data packet with a header and a data part for communication between two devices. The data part may have fields that identify (i) a sub-code that indicates the nature and source of the safety code, among other safety codes, (ii) a partial or complete vehicle id, (iii) a flag if the vehicle is in motion, including a vehicle speed threshold, and (iv) an actual speed of the vehicle at the time the ISC code is generated.

As illustrated in FIG. 1C, the second type of code 16B has a header part and a data part. Prior art teaches data packet with a header and a data part for communication between two devices. The data part has sub-codes that conveys data from the smart phone to the vehicle and may identify sub-codes for, (i) a code that indicates the nature and source of the safety code, among other safety codes, (ii) a partial or complete smart phone id, (iii) a flag if the SMS feature is activated, and (iv) an SMS is received.

This code 16B may be made a part of a function that already exists in the smart phone that may be used when the smart phone and the vehicle are paired but has not been previously used for a texting safety application. As an illustration, when a smart phone and vehicle are paired up, the vehicle receives data related to smart phone, such as number of bars, battery life etc. This protocol may be extended to include a specific type of phone use data besides a voice call and would include use of SMS mode of the phone.

Not all of the data in the ISC 16A may be used by the smart phone and some additional fields may be reserved for future use. The data structure of the ISC code 16A and 16B may be different then what is described above and is likely arrived at by a consortium of vehicle-manufacturers and smart phone manufacturers as part of an industry-wide effort to increase vehicle safety.

Modern vehicles already come equipped with short distance wireless electronics that enable the vehicle electronics to be paired up with external devices such as smart phones. An example of such a short distance wireless is Bluetooth protocol that is widely used in the industry. In the future there may be other or different short wireless protocols that may be used.

Figure 2A:
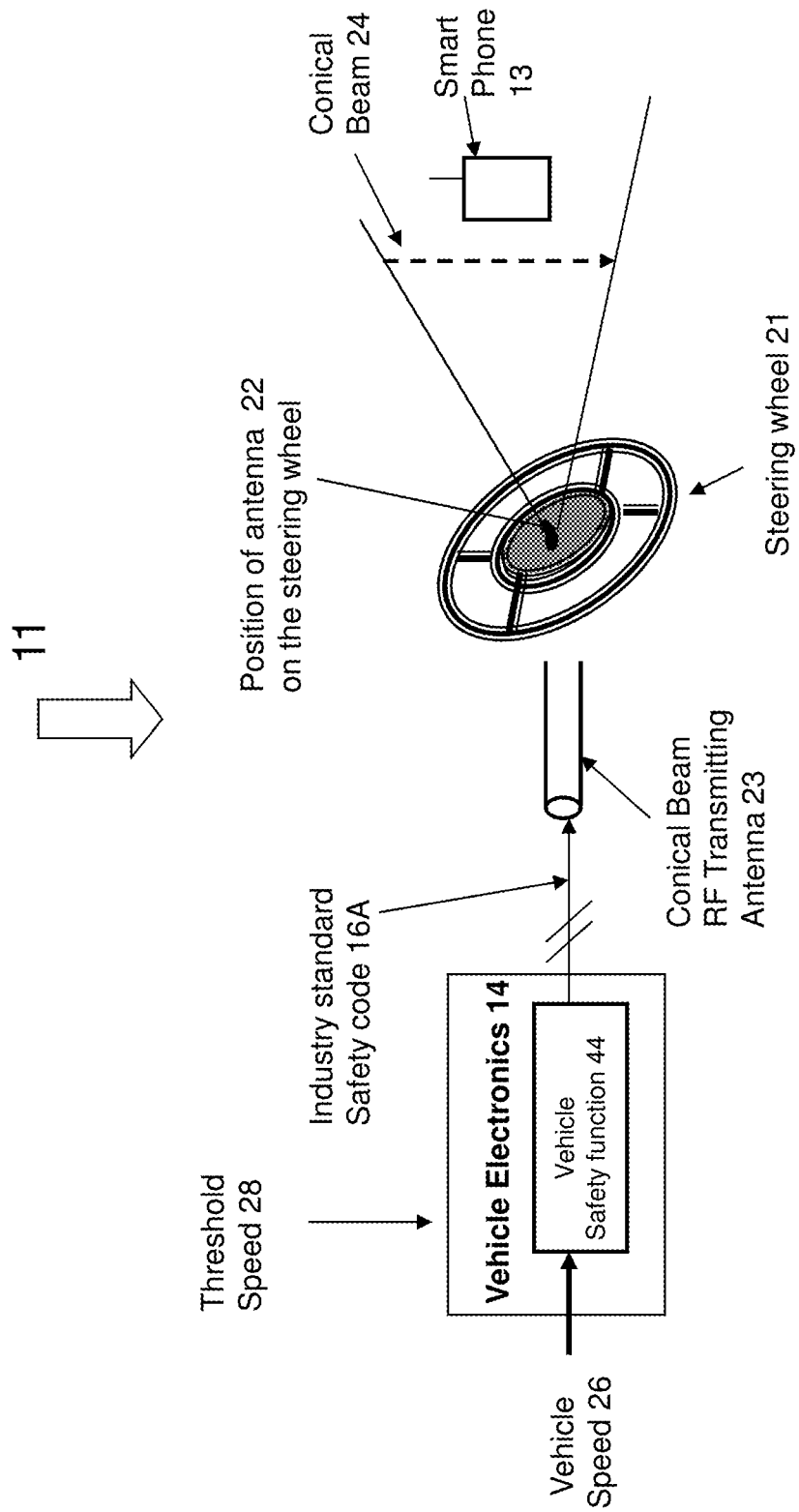
FIGS. 2A, 2B and 2C are block diagram of an embodiment 11 of a vehicle safety system.

Therefore, the ISC 16A may be broadcast from the vehicle electronics 14 via short distance RF electronics. The RF transmission may be of the type that would be picked up by an already paired smart phone anywhere in the vehicle or the transmission may be via a conical beam RF transmitting antenna 23, as illustrated in FIG. 2A, positioned near the driver seat and that enables only the driver while holding or having the smart phone in the driver seat to be able to receive the RF transmission.

The ISC code 16A and 16B may be transmitted every few seconds such as from three to five seconds. Such an interval, it is believed, would provide for an optimum performance of the safety system 10 that includes both the vehicle electronics 14 and the smart phone 13. While this time period is preferred, it may be less or more than that.

Instead of vehicle speed, vehicle ignition may also be used to indicate the vehicle is either in motion or capable of imminent motion. Instead of any of these, pairing of the vehicle and the smart phone may be used for an indication that the driver has entered the vehicle and is capable of immediately driving the vehicle.

However, if the vehicle is not in ignition state, it may still begin pairing with the smart phone in the vehicle, depending on how this feature is implemented by the vehicle manufacturers.

One or more of these indications may be used to activate the sending of the industry safety codes 16A and 16B from the vehicle electronics 14 and the smart phone 30 respectively.

Embodiment 11

As illustrated with the help of FIG. 2A, a vehicle safety system embodiment 11 has vehicle safety function 44 in a part of vehicle electronics 14.

The function 44 receives input of vehicle speed 26 and, if the vehicle speed 26 exceeds a threshold 28 such as 1 to 3 mph, outputs an industry standard safety code (ISC) 16A. The output of the ISC 16A is wired to an RF antenna 23.

An RF antenna 23 is preferably mounted in the center 22 of the steering wheel 20. Alternatively the antenna 23 may be mounted on top of driver head in the ceiling of the vehicle (not shown).

The antenna 23 emits a conical beam that covers only a driver in the driver seat. Technology of conical and directional antenna is prior art and requires a tube or tunnel to channel RF energy in a specific direction.

The antenna 23 may be mounted in any other suitable location as well. There may be two antennas to provide better coverage of the driver in the driver seat. The conical beam 24 of the antenna 23 covers a smart phone 13 being held by a driver of the vehicle.

The safety function 44 outputs an RF signal such as Bluetooth protocol every 3 to 5 seconds. The RF signal has embedded in it an industry standard texting-safety code 16A. The details of the code 16A have been provided earlier with the help of FIG. 1B.

Figure 2B:
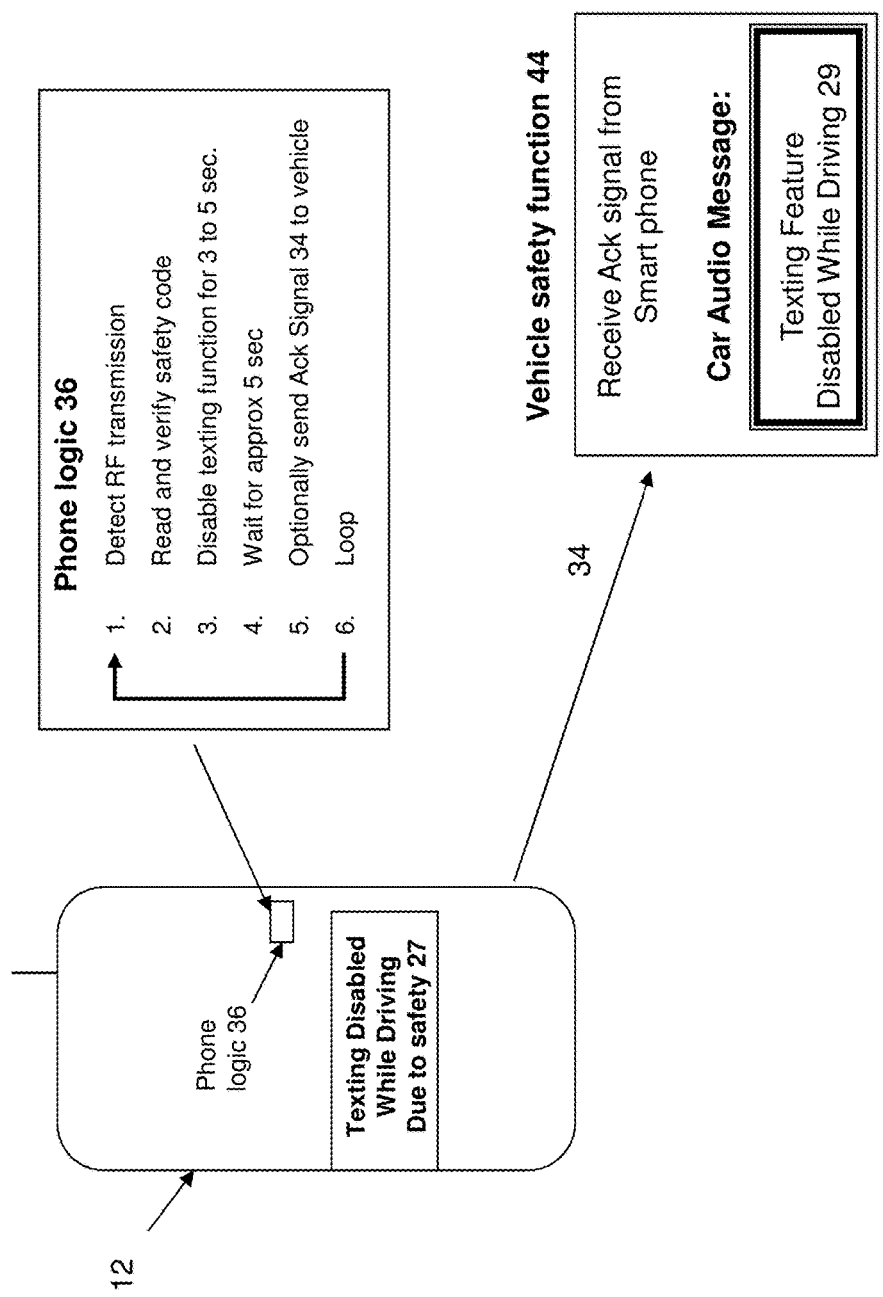
Figure 2C:
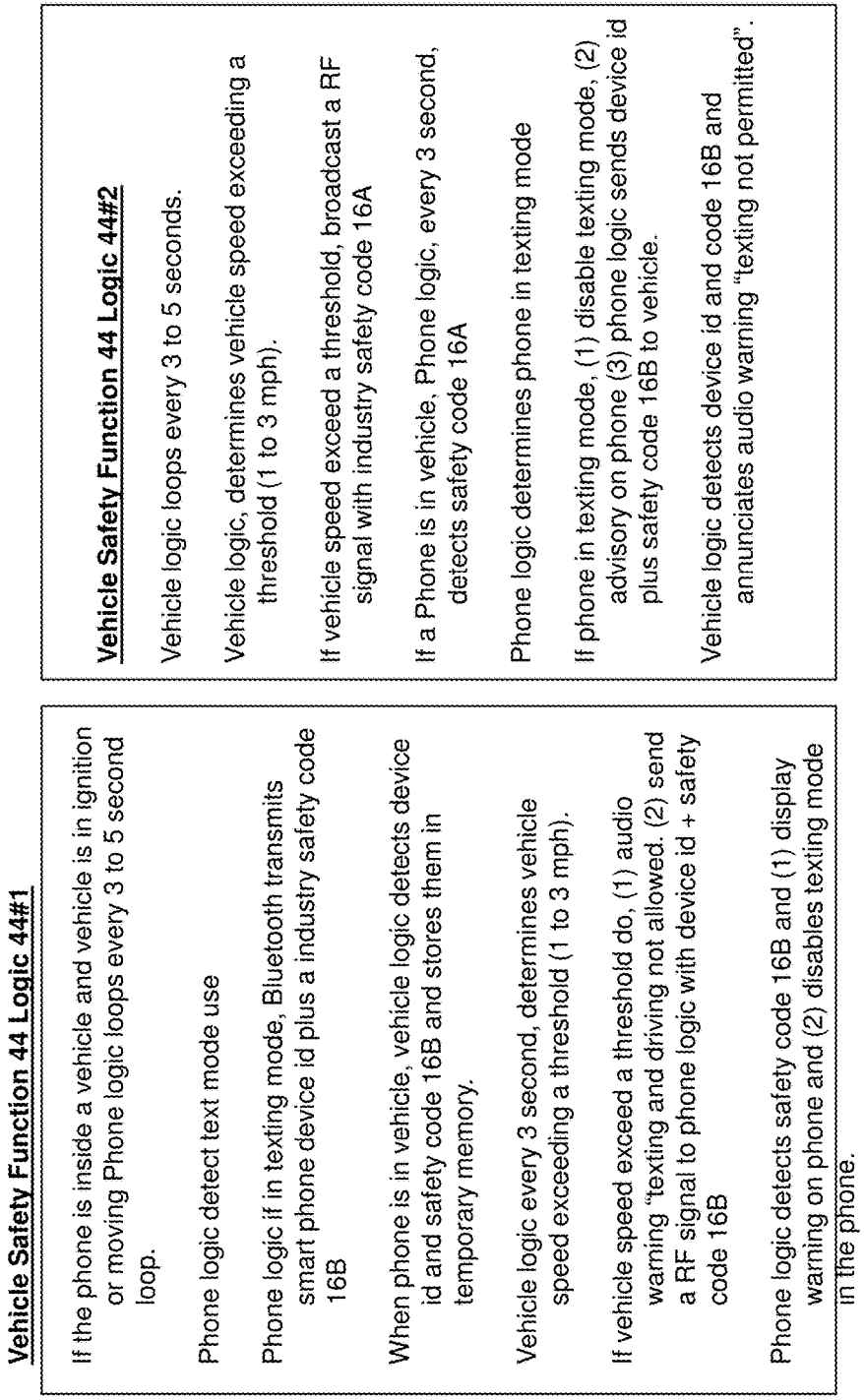

As illustrated in FIG. 2B, a smart phone 13, in the hands of the driver using phone logic 36 in the smart phone 13, (i) detects RF transmission, (ii) reads and verifies safety code 16A, (iii) disables texting function, (iv) waits for approx 5 sec, (v) optionally sends ack signal to vehicle electronics and then (vi) loops back to the step (i).

The phone logic 36 also displays a message 27 on the phone screen. The message 27 may state "Texting disabled while Driving Due to Safety"

Optionally, the logic 36 also sends an Ack RF signal 34 via Bluetooth RF to the vehicle safety function 44. When the vehicle receives the ack signal 34, it may use the signal to create an audio warning 29 on the vehicle audio system.

Such a safety code 16A or system 10 does not, it is believed, currently exist and may be adopted by the auto industry as well as the smart phone industry in the interest of enhancing public safety.

The cost of implementing such a system 10 for the vehicle manufacturer and the phone device maker would be minimal and may be required by federal safety regulations.

Vehicle Safety Function 44:

The vehicle safety function 44 works in conjunction with a phone logic 36 as described below.

Phone Logic 36:

Details of phone logic 36 in the smart phone 13 are illustrated with the help of FIG. 2B. A Cell Phone is usually set up to detect Bluetooth signals in their near vicinity environment. Most phones are set to do that automatically. The phone logic 36 in the smart phone 13 that is in the driver hand or upper body, when the driver is inside or near his/her vehicle, detects the RF transmission in the form of Bluetooth advisory signal from the vehicle and verifies the presence of the industry safety code 16A.

If the phone 13 detects the advisory signal with the safety code and if the safety code indicates that the vehicle is moving or in motion, phone logic 36 disables the texting functions of the phone 13 for duration of approximately three to five seconds. Phone logic 36 displays an advisory message 27 on the phone that the texting function has been disabled as the vehicle is in motion due to safety reasons.

In one embodiment texting by any phone in the vehicle may be disabled, while the vehicle is being driven, as all the phones in the vehicle would pick up the transmission of the industry safety code 16A.That may not be a desirable condition as the other passengers with smart phone do not present the danger of texting and driving.

Therefore, in another embodiment, texting only by the driver in the driver seat would be disabled, while the vehicle is being driven leaving other passengers in the automobile to be free to use any phone in text mode. In this mode a conical antenna 23 is used and would be required to direct the RF signal with the safety code to the driver seat only. The conical antenna 23 has been illustrated earlier with reference to FIG. 2A.

In yet another embodiment, phone logic 36 sends "phone in texting use" signal 34 via vehicle RF electronics, while driver attempts texting. Vehicle safety function 44 detects "phone texting in use" signal and annunciates an advisory via vehicle audio system: "Texting Feature Disabled While Driving".

There are different aspects of vehicle safety function 44 working in conjunction with the phone logic 36 that may be used. As illustrated with the help of FIG. 2C, some are described herein while others are not ruled out:

Vehicle Safety Function 44—Logic #1
1. If the phone is inside a vehicle and vehicle is in ignition or moving Phone logic loops every 3 to 5 second loop.
2. Phone logic detect text mode use
3. Phone logic if in texting mode, Bluetooth transmits smart phone device id plus a industry safety code 16B
4. When phone is in vehicle, vehicle logic detects device id and safety code 16B and stores them in temporary memory.
5. Vehicle logic every 3 second, determines vehicle speed exceeding a threshold (1 to 3 mph).
6. If vehicle speed exceed a threshold do, (1) audio warning "texting and driving not allowed. (2) send a RF signal to phone logic with device id+safety code 16B
7. Phone logic detects safety code 16B and (1) display warning on phone and (2) disables texting mode in the phone.

Vehicle Safety Function 44 Logic #2
1. Vehicle logic loops every 3 to 5 seconds.
2. Vehicle logic, determines vehicle speed exceeding a threshold (1 to 3 mph).
3. If vehicle speed exceed a threshold, broadcast a RF signal with industry safety code 16A

4. If a Phone is in vehicle, Phone logic, every 3 second, detects safety code 16A
5. Phone logic determines if phone in texting mode
6. If phone in texting mode, (1) disable texting mode, (2) advisory on phone (3) phone logic sends device id plus safety code 16B to vehicle.
7. Vehicle logic detects device id and code 16B and annunciates audio warning "texting not permitted".

Vehicle Safety Function 44 Logic #3

1. Vehicle logic loops every 3 to 5 seconds.
2. Vehicle logic, determines vehicle speed exceeding a threshold (1 to 3 mph).
3. If vehicle speed exceed a threshold, broadcast a RF signal with industry safety code 16A
4. If a Phone is in vehicle, Phone logic, every 3 second, detects safety code 16A and disable texting mode and displays on phone safety warning.

Other variations of the above embodiments are possible and not ruled out.

Embodiment 12

SMS has turned out to be an important mode of communication that is preferred by younger generation. Hence, this embodiment 12 provides for a hands-free and eyes-free SMS capability in the smart phone while driving a vehicle.

Texting has different operational modes of use for receiving a message and sending a message. When receiving a message, the first is an audio alert, second is reading the received message and the third is reply to the text message. When sending a message, the first is selecting a destination, second is creating the message, third is sending the message, and fourth is waiting for a response message if one is required. Each of these modes requires different types of response or action or attention from a device user in terms of use of eyes, ears, and fingers.

Alerting requires ears, reading requires both hands and eyes, and replying and sending both require hands and eyes. As an alternative or in addition, to disabling texting on the device for safety, while the vehicle is in motion, different technologies may also be employed to effectively perform the functions of texting without using hands and eyes, that is, without taking attention off the road.

These technologies are described here and may be used alone or in conjunction with the technologies described earlier. User behaviors are different and are in different in age groups and one age group would prefer one or the other or both embodiments depending on the specific situation. One may be preferred in an emergency, while other may be used in non-emergency situations. These alternative embodiments of safe texting are described here.

When a text message is received in the smart phone, the text message is routed to a text-to-speech conversion module. The module may be positioned either in the smart phone device or the vehicle electronics. The spoken text will be heard on the vehicle audio system. If the module in positioned in the smart phone, the text is converted to speech and routed to the vehicle electronics to be played in the vehicle audio system.

The prior art already provided audio communication between smart phone and vehicle electronics as for example when using smart phone in a vehicle to make or receive audio calls. If the module is in the vehicle electronics, then the text is sent via Bluetooth to the vehicle where the text would be converted to audio.

Which of these two approaches, either vehicle electronics or the smart phone, to incorporating the text to speech and speech to text conversion module may be used would depend on the cooperation of the smart phone and vehicle electronics manufacturers. However both approaches may be used, enabling the smart phones and the vehicle industry to use one or the other or be set up based on driver/smart phone preferences.

When a user wants to send text message or reply to text message, the technology of spoken words to text conversion may be used. The user just communicates with the vehicle or the device via speech commands and the device or the vehicle receives these commands and the spoken text message and converts the commands in the spoken words to text.

This embodiment provides hands free SMS ability to receive and reply or send SMS in hands-free and eyes-free mode. This embodiment thus enables the driver to have SMS while keeping his attention on the road and the hands on the steering wheel.

Figure 3A:
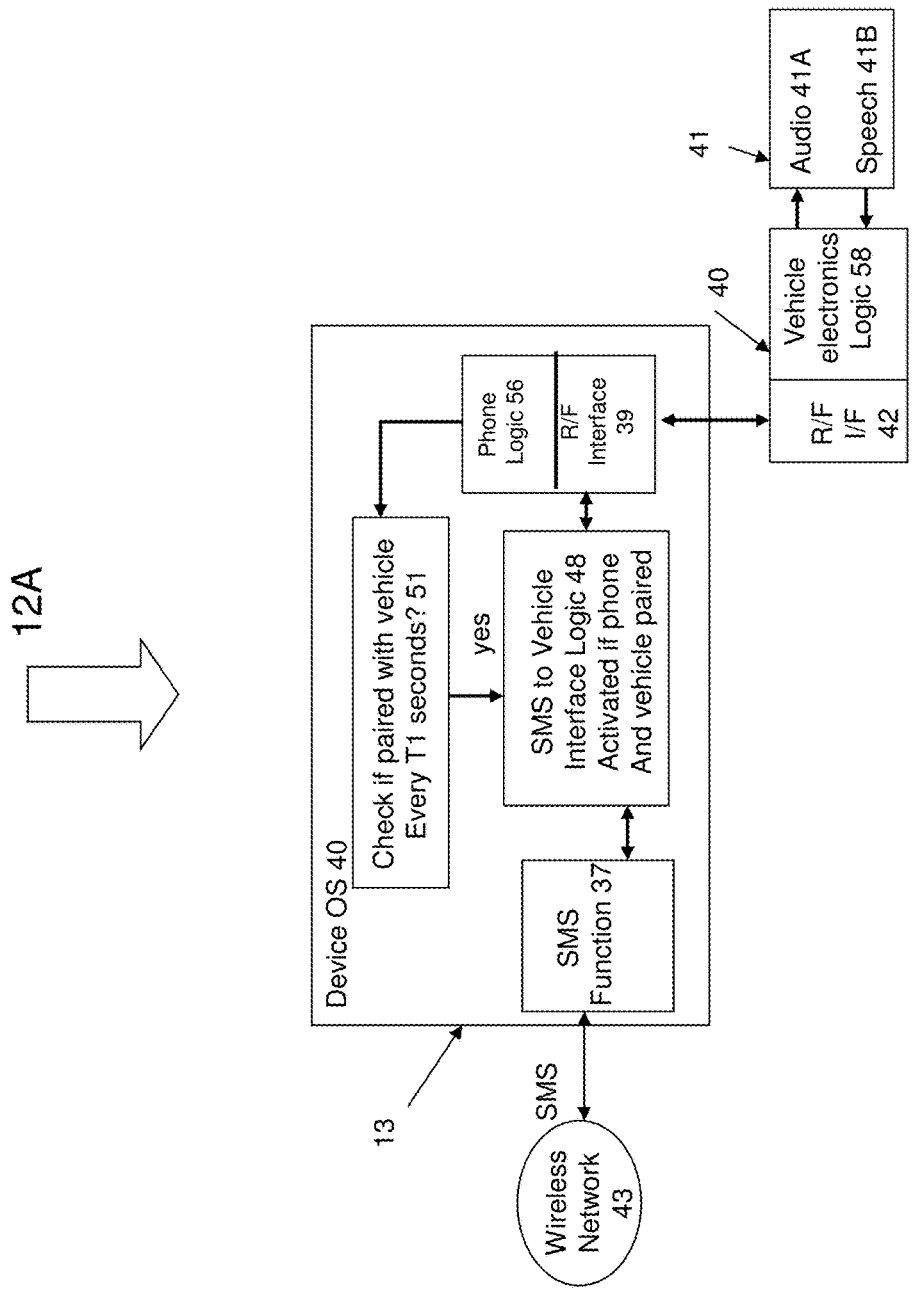
FIG. 3A and 3B are block diagrams of an embodiment 12A of the vehicle safety system.

With reference to FIG. 3A, embodiment 12A is described. A smart phone device 13 has a prior art OS 40 and a SMS function 37 working via a wireless network 43. In this embodiment, Phone logic 56 using SMS vehicle interface logic 48 interfaces with phone via short distance radio frequency (SRF) 39 and that interfaces with vehicle short distance radio frequency (SRF) module 42. Vehicle logic 58 interfaces with car system 41 that includes audio 41A and car speech sensor 41B.

As shown in FIG. 3A, logic 51 in the smart phone 13 activates the logic 56. Logic 51 checks every T1 seconds if the smart phone and the vehicle are paired. If they are paired then the logic 56 is executed and becomes operational. As soon as the pairing stops, indicating driver had left the vehicle, the logic 56 is deactivated.

Figure 3B:
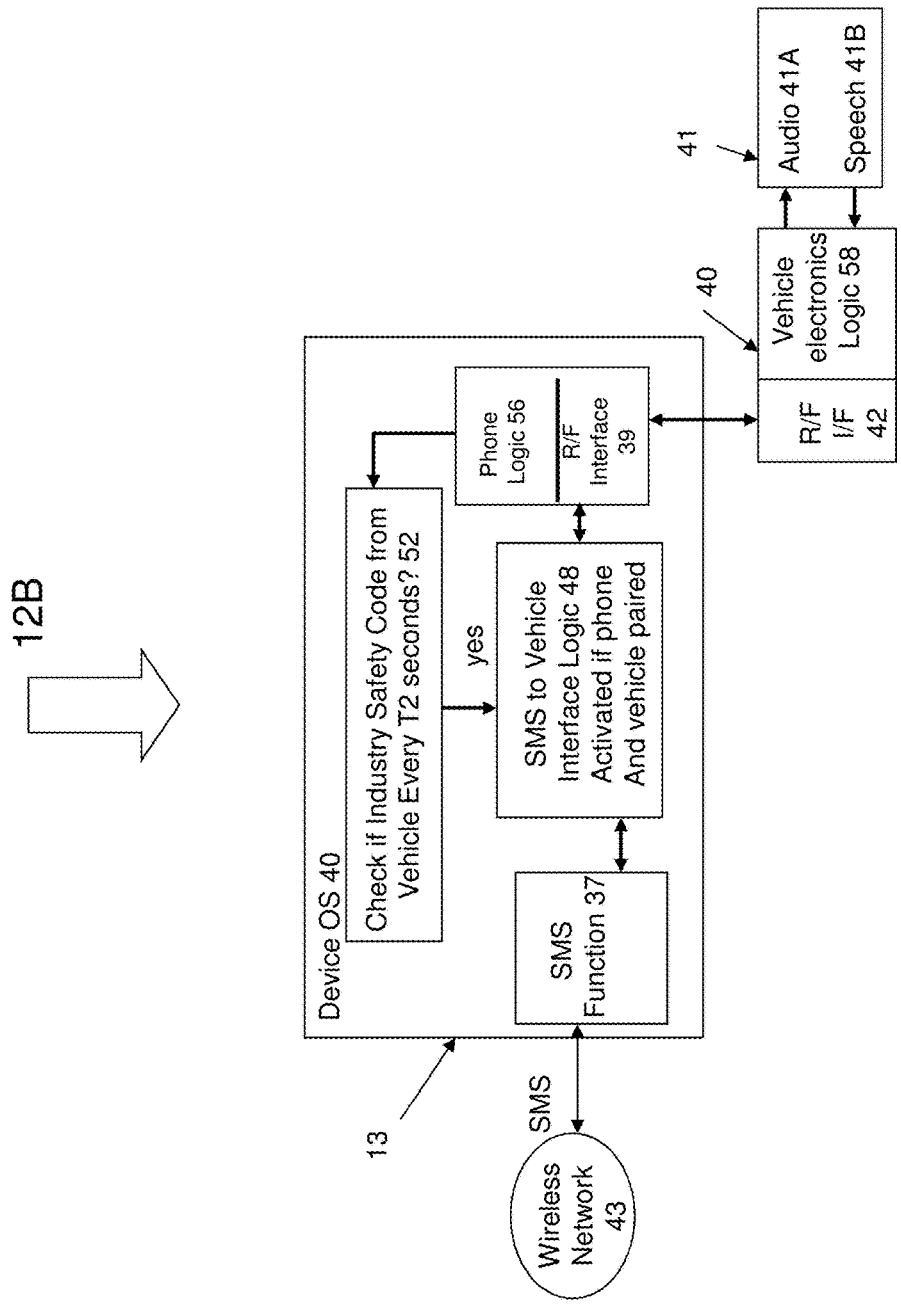
Figure 4A:
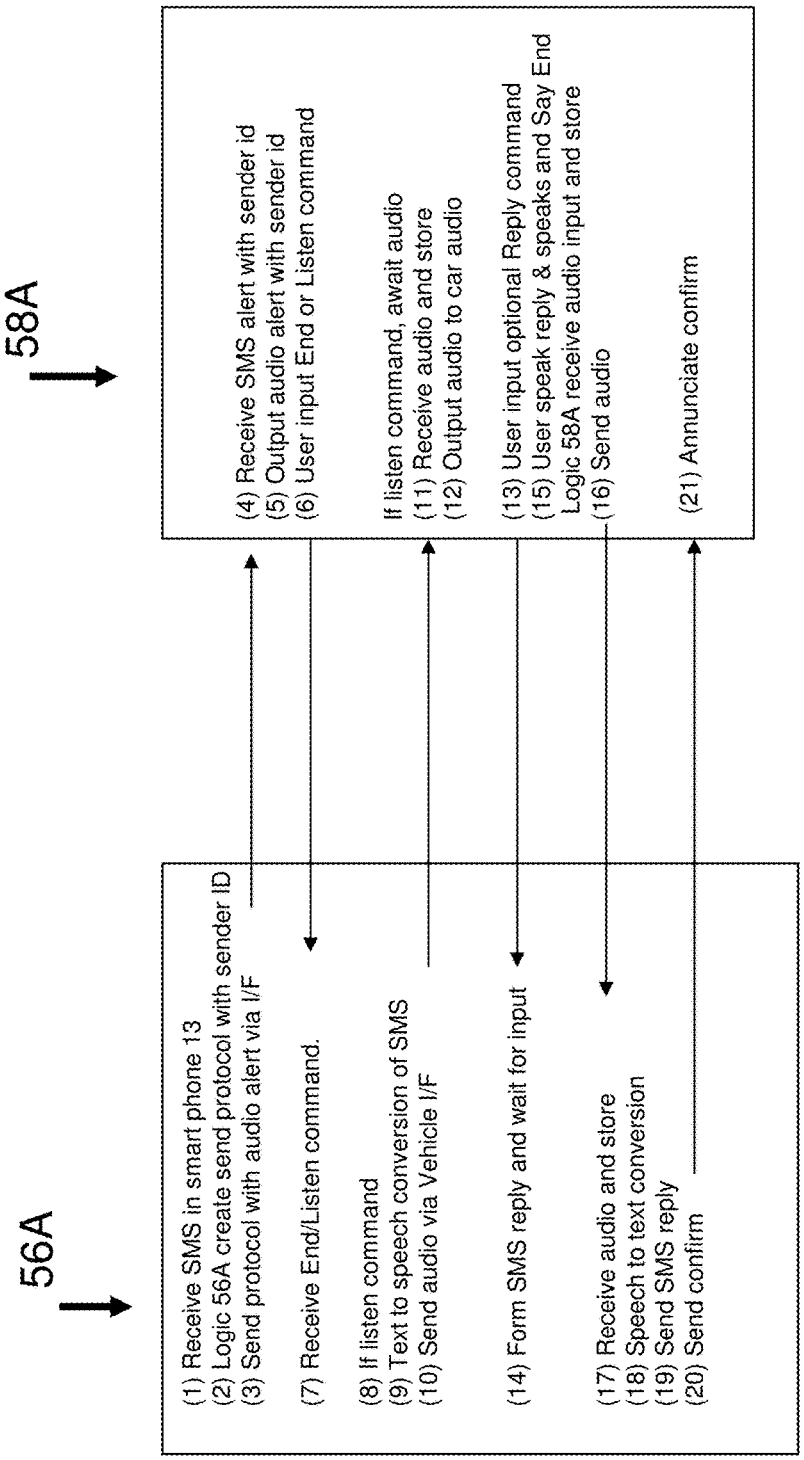
FIGS. 4A and 4B are interface block diagram of interfaces of embodiment 12A of the vehicle safety system.
Figure 4B:
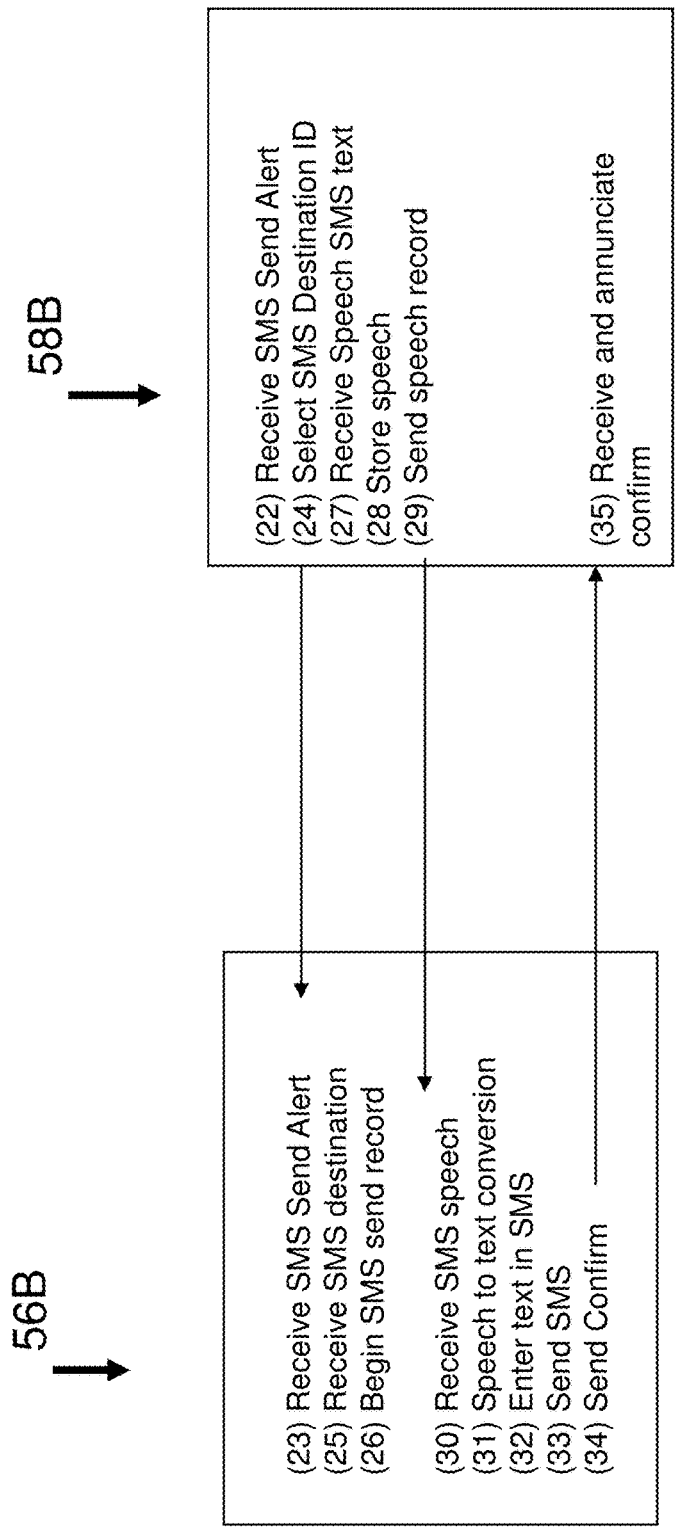

As shown in FIG. 3B, embodiment 12B is described. Logic 52 in the smart phone 13 activates the logic 56. Logic 52 checks if the smart phone and the vehicle are paired and an industry safety code is being received from the vehicle electronics to indicate that the vehicle is in motion. The safety code has been described earlier with the help of embodiment 10. If the safety code is being received every T2 seconds, the logic 56 is activated and remains activated. When the code stops being received, indicating the vehicle is not moving, the logic 56 is deactivated.

The phone logic 56 has two parts 56A and 56B and the vehicle logic 58 has two parts 58A and 58B. The logic steps of these are illustrated with the help of FIGS. 4A and 4B.

The logic 56A in the smart phone 13 and logic 58A in the vehicle electronics 14 are used to receive an SMS in the logic 56A and heard via vehicle audio using logic 58A. The driver is first alerted of a receipt of a SMS along with its sender id. The driver then may elect to hear the SMS text and, and if the driver desires to send a reply SMS to be able to send a reply message in spoke words. With the help of FIG. 4A, the logic steps of logic 56A and 58A are:

(1) Receive an SMS message over the wireless network in the smart phone 13
(2) Logic 56A in the smart phone creates a message protocol with sender ID
(3) Logic 56A sends the message protocol with audio alert to logic 44A in the vehicle via the RF Interface
(4) Logic 58A receives the message protocol alert with sender id
(5) Logic 58A via vehicle audio system outputs the message alert with sender id for a response by the driver.
(6) Driver/User input via speech an "End command" or a "Listen command"
(7) Logic 58A receives End/Listen command.
(8) If listen command (9) Logic 56A creates a Text to speech conversion in response to Listen SMS command from logic 58A to logic 56A
(10) Logic 58A sends the Listen command via Vehicle RF interface to logic 56A
If user inputs Listen command, logic 56A performs text to speech conversion of SMS message and Logic 58A awaits audio from smart phone logic 56A
(11) Logic 58A receives audio and store
(12) Logic 58A outputs audio to car audio
(13) Logic 58A receives User input optional Reply or END command
(14) If Reply command, logic 58A wait for input speech
(15) Logic 58A lets User speak Reply & speaks and says End command
(16) Logic 58A receive audio input and stores in vehicle electronics and Logic 58A send audio to logic 56A
(17) Logic 56A receives audio and stores in the smart phone
(18) Logic 56A performs speech to text conversion of the audio
(19) Logic 56A creates SMS reply text with the converted text
(20) Logic 56A sends message and sends confirm to logic 58A
(21) Logic 58A annunciates confirm via car audio system.

The logic 56B in the smart phone 13 and logic 58B in the vehicle electronics 14 is used to send an SMS from the vehicle via the smart phone. With the help of FIG. 4B, the logic steps of logic 56B and 58B are:
(22) User/driver speaks in vehicle Send SMS command
(23) Logic 58B receives SMS Send command
(24) Logic 58B prompts for selection or speak by driver of a SMS Destination ID
(25) Logic 58B receives SMS destination ID
(26) Logic 58B sends to logic 56B, a Begin SMS command record with destination id
(27) Logic 58B then alerts user for speaking SMS text via Ready for "SMS Text"
(28) Logic 58B then receives and store spoken SMS text
(29) Logic 58B sends speech record to Logic 56B
(30) Logic 56B receives SMS speech
(31) Logic 56B does speech to text conversion
(32) Logic 56B enter text in already opened SMS send record
(33) Logic 56B sends SMS
(34) Logic 56B sends Confirmation to Logic 58B
(35) Logic 58B receives and annunciates Confirmation to driver.

People generally use when communicating via SMS, slang or shortened or abbreviated words. As a simplified illustration letter "u" may be used for word "you". Therefore to help in the text to speech conversion and speech to text conversion, a translation dictionary is provided.

Figure 5:
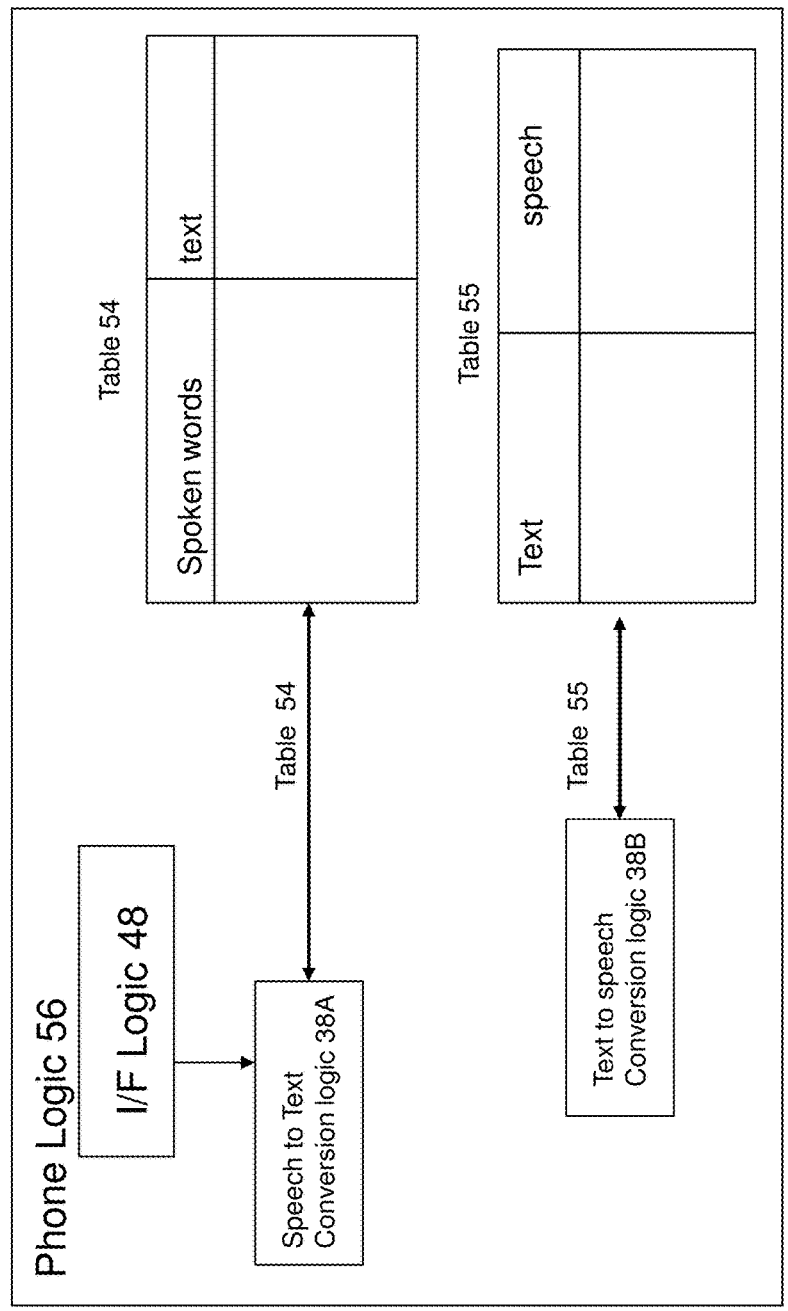
FIG. 5 is a block diagram of an embodiment of a SMS phone function that is used with the vehicle safety system.

As illustrated in FIG. 5, the phone logic 56 uses text to speech logic 38B and speech to text conversion logic 38A. The logic 38A and logic 38B interface respectively with table 54 and table 55. The tables 54 and 55 provide dictionary for words that are slang and abbreviations that are commonly used in SMS by many people.

Mode of Use

In one mode, a driver enters his vehicle with a smart phone in the pocket. Driver turns on the ignition. The phone and vehicle are paired and vehicle ignition triggers start of sending code 16A to smart phone. On receiving code 16A, smart phone activates phone logic 56.

Subsequently at some time, a SMS in the smart phone is received and SMS function 37 routes the SMS audio alert and sender id to car audio system. Driver on hearing the SMS alert and the sender id knows that an identified person has sent an SMS. The driver may choose to listen to the SMS or not chose to listen depending upon priority assigned to the SMS sender. If the driver decides to listen, driver speaks commands Listen and the smart phone routes speech version of SMS to the vehicle audio system.

Driver listens to SMS spoken audio and after a pause decides to reply to the SMS or not reply. If the driver decides to reply, speaks commands Reply. The Smart phone activates reply SMS and waits for the text entry.

Driver speaks the reply speech and reply speech after being converted to text is entered as text in the SMS reply. The function 37 then waits for a spoken Send command and on receiving such a command, sends the reply message text.

There may be other commands that may also be used to facilitate such an interaction and are not ruled out. For example, the driver after having spoken the SMS reply text may want to read/listen it or change it before driver decided to Send it.

In another mode, a driver enters his vehicle with a smart phone in the pocket. Driver turns on the ignition and starts driving. The phone and vehicle are paired and the speed of the vehicle and not the state of ignition triggers start of sending code 16A to smart phone. On receiving code 16A, smart phone activates phone logic 56.

Subsequently at some time, a SMS in the smart phone is received and function 37 routes the SMS audio alert and sender id to car audio system. Driver on hearing the SMS alert and the sender id knows that an identified person has sent an SMS. The driver may choose to listen to the SMS or not chose to listen depending upon priority assigned to the SMS sender. If the driver decides to listen, speaks command Listen and the smart phone routes speech version of SMS to the vehicle audio system.

Driver listens to SMS spoken audio and after a pause decides to reply to the SMS or not reply. If the driver decides to reply, speech commands Reply. The Smart phone activates reply SMS and waits for text entry.

Driver speaks the reply speech and reply speech after being converted to text is entered as text in the SMS reply. The function 37 then waits for a spoken Send command and on receiving such a command, sends the reply message text.

There may be other commands that may also be used to facilitate such an interaction and are not ruled out. For example, the driver after having spoken the SMS reply text may want to read/listen it or change it before driver decided to Send it.

In yet another mode, a driver enters his vehicle with a smart phone in the pocket. Driver turns on the ignition and starts driving. The phone and vehicle are paired and the vehicle speed and not the state of ignition trigger start of sending code 16A to smart phone. On receiving code 16A, smart phone activates phone logic 56.

Subsequently at some time, driver decides to send an SMS and speaks a Send SMS command and is then prompted to either select or speak a destination id.

Smart phone SMS logic receives these two commands and creates a send SMS text box. The driver is then prompted to speak the SMS content which is entered as text in the SMS text box. Driver is then prompted to speak command Send. On receiving a Send command, the SMS logic sends the SMS and audio confirmation via a tone that is heard by the driver.

There may be other commands that may also be used to facilitate such an interaction and are not ruled out. For example, the driver after having spoken the SMS reply text may want to read/listen it or change it before driver decides to send it.

There may be other modes of use that have not been described. These modes of use as above have been described as simplified illustrations of how a driver of a vehicle equipped with safe-texting system 10 may use the system.

A vehicle safety system, comprising: a safe-texting safety logic in a vehicle electronics that is periodically being input one of (i) a vehicle speed, (ii) state of ignition, or (iii) both (i) and (ii). The logic, if the vehicle is in ignition or alternatively vehicle speed exceeds a threshold, transmits via a short distance protocol RF transmission an industry standard safe-texting safety code.

The logic transmits the safety code only when the vehicle electronics detects that a smart phone has been paired up with vehicle electronics.

The safety system has an antenna that is a conical beam RF transmitting antenna is used for transmission. The antenna is positioned near the driver seat of the vehicle, enabling only a smart phone with the driver to be able to receive the industry safety code.

The smart phone has phone logic that detects the RF signal transmission and verifies the industry standard safe-texting safety code from the signal. The logic if the code indicates vehicle ignition or vehicle in motion disables an SMS mode of the smart phone. The logic sends an acknowledgment signal via the RF to the vehicle electronics.

The vehicle electronics logic receives the acknowledgment signal and annunciates via vehicle audio system an advisory that "now SMS use via by auto mode is operational".

The phone sends "phone in texting use" signal via vehicle RF electronics, when driver attempts SMS texting. The vehicle electronics logic detects "phone texting in use" signal from smart phone and annunciates an advisory via vehicle audio system: "Use of Texting Not allowed while driving".

A safe-texting-safety logic receives short distance RF transmission of a safety code from vehicle electronics. The logic parses the code and if the vehicle is in ignition or in motion activates safe-texting SMS logic in the smart phone. The safe-texting SMS logic has an interface with the vehicle electronics to route SMS data and voice commands for receiving and sending SMS between the smart phone and the vehicle electronics equipped with an audio and microphone system.

The SMS logic has a text to speech conversion (TSC) module and a speech to text conversion (STC) module. The logic uses TSC module to convert text of received SMS messages to speech and routes to Vehicle electronics. The logic uses STC module to convert speech received from the vehicle electronics to text for use in an SMS.

The SMS logic has a text to speech conversion (TSC) module and a speech to text conversion (STC) module. The logic uses TSC module to convert SMS text command and actions to speech and routes to Vehicle electronics. The logic uses STC module to convert speech received SMS commands and actions from the vehicle electronics to text for use in an SMS.

The SMS logic has a text to speech conversion (TSC) module and a speech to text conversion (STC) module. The modules have access to a library of words that are used in SMS. The logic uses the libraries to facilitate text to speech and speech to text conversion.

A system of safety for using a hands and eyes free SMS feature in a smart phone inside a vehicle, comprising: a phone-logic in the smart phone detects a received SMS and sends an SMS received alert to the vehicle electronics via RF along with sender name in a form suitable for a vehicle audio system to annunciate the alert and sender name; the logic awaits for a response from the vehicle electronics to route or not route the text to the vehicle electronics; the logic on receiving a response to route from vehicle electronics converts the SMS text to speech, using a text to speech conversion algorithm and routes the speech to vehicle audio system.

The logic waits for a speech reply from the vehicle and if received temporarily stores speech and inputs to a speech to text conversion algorithm. The logic sends a SMS reply using the text from the algorithm, thereby providing a hands and eyes free SMS capability to receive and reply to an SMS while in the vehicle.

The logic detects a digital code transmission from the vehicle electronics and parses the content of the code. If the code indicates vehicle not in motion, disables the implementation of features of safe-texting-safety logic and if the code indicates vehicle is in motion enables the implementation of features of safe-texting-safety logic.

A system of safety for using a hands and eyes free SMS feature in a vehicle using smart phone inside a vehicle, comprising: a vehicle-logic interfaces with a vehicle audio and microphone devices and detects an audio request to send a SMS and enables a driver to select a telephone number from a pre-stored list of telephone numbers by name or number; the logic sends the SMS request and the SMS destination to a paired smart phone; the logic awaits a speech message for SMS from the driver via vehicle microphone device and routes the speech received SMS to smart phone; the logic awaits for a speech SMS reply from the smart phone and plays using vehicle audio device, thereby proving a hands and eyes free SMS capability to send and reply to an SMS while in the vehicle.

The logic detects a digital code transmission from the phone electronics and parses the content of the code; if the code indicates SMS not in use disables the implementation of features of safe-texting-safety logic; if the code indicates SMS in use enables the implementation of features of safe-texting-safety logic.

Method of Use

A method of use is described with the help of FIG. 6A and 6B, where all the steps may not be used or used in the order specified. FIG. 6A is method steps for receiving SMS in smart phone and smart phone communicating with the vehicle electronics. With reference to FIG. 6A, At step 100, receiving SMS in smart phone 13

At step 102, creating by Logic 56A send protocol with sender ID

At step 104, sending via Send protocol audio alert via I/F

At step 106, receiving SMS alert with sender id

At step 108, outputting audio alert with sender id

At step 110, inputting by a user End or Listen command

At step 112, receiving by the phone logic End/Listen command.

At step 114, If listen command

At step 116, performing text to speech conversion of SMS

At step 118, sending audio via Vehicle I/F, If user inputs listen command, await audio from smart phone At step 120, receiving audio by the vehicle electronics and storing the audio clip.

At step 122, outputting audio by vehicle electronics to car audio system

At step 124, receiving from User input optional Reply command

At step 126, forming a SMS reply and wait for text input

At step 128, speaking by user reply & speaks and Say End Logic 58A receive audio input and store At step 130, sending audio by vehicle electronics to smart phone At step 132, receiving audio by the smart phone and temporarily storing it.

At step 134, performing by smart phone speech to text conversion

At step 136, inputting text for sending SMS reply

At step 138, sending confirm by smart phone to vehicle

At step 140, annunciating confirm by vehicle audio

FIG. 6B is method steps for sending SMS from vehicle to a smart phone and smart phone communicating with the vehicle electronics. With reference to FIG. 6B, At step 142, receiving by vehicle spoken SMS Send Advisory At step 144, receive by vehicle SMS Send Alert At step 146, selecting by user SMS Destination ID At step 148, receive by vehicle SMS destination At step 150, forming in smart phone SMS send record At step 152, receiving by vehicle spoken SMS text At step 154, storing by vehicle speech At step 156, sending by vehicle to smart phone speech record At step 158, receiving by smart phone SMS speech clip At step 160, performing by smart phone speech to text conversion At step 162, entering by smart phone text in SMS At step 164, sending by smart phone the SMS At step 166, sending by smart phone to vehicle, Send Confirm At step 168 receiving by vehicle and annunciating SMS send confirm In summary, the preferred embodiments are on a vehicle safety system 10 that disables texting use of phone while the vehicle is being driven.

While the particular invention, as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. A vehicle safety system, for a vehicle driven by a driver, the vehicle safety system being adapted to selectively inhibit texting by the driver using a mobile phone, the vehicle having (i) a vehicle body that includes a driver's seat where the driver is positioned during driving of the vehicle; (ii) an ignition having an on state and an off state; and (iii) a vehicle speed system that determines a vehicle speed of the vehicle; the vehicle safety system comprising:

a vehicle electronics secured to the vehicle body, the vehicle electronic including (i) a CPU, (ii) a memory, and (iii) a safety logic operating in a CPU and a memory of the vehicle electronics, wherein the vehicle electronics is input a vehicle speed with which the vehicle is moving;

the safety logic periodically receives the vehicle speed and compares with a preset speed threshold in the memory and when the vehicle speed exceeds the preset threshold, the safety logic automatically initiates a transmission of an electronic signal, wherein the electronic signal embeds a texting-safety digital code, via a short distance wireless transmission protocol, and wherein the transmission, using a directional transmitting antenna, is confined to an interior area of the vehicle that is occupied by the driver, and wherein, the transmission of the electronic signal is for use by a mobile wireless device positioned in the interior area of the vehicle that is occupied by the driver, wherein the use of the electronic signal by the mobile wireless device is without the driver interaction.

2. The system as in claim 1, further comprising:

the periodic transmission of the electronic signal is via a short distance wireless transmission protocol, wherein the electronic signal is in the form of a digital word, wherein, digital word is used by the mobile wireless device to effect a change of operation inside the mobile wireless device.

3. The system as in claim 1, further comprising:

the periodic transmission of the electronic signal is via a short distance wireless transmission protocol, wherein the electronic signal is in the form of a digital word, wherein, a plurality of bits in the digital word are set to represent the vehicle speed for use by the mobile wireless device to effect a change of operation inside the mobile wireless device.

4. The system as in claim 1, further comprising:

the preset speed threshold is one from a group of 0 mph, 1 mph, 2 mph, 3 mph, 4 mph and 5 mph.

5. The system as in claim 1, further comprising:

the periodic transmission of the electronic signal is at the rate of one from a group of, every 1 second, every 3 second, 5 sec, 7 sec and 10 sec.

6. The safety system as in claim 1, further comprising:

the safety logic transmits the electronic signal only when the vehicle electronics detects that a smart phone has been paired up with the vehicle electronics.

7. The safety system as in claim 1, further comprising:

the transmission of the electronic signal is via a one way RF antenna embedded in one of, a steering wheel, instrument panel, a dash board, and a roof of the vehicle.

8. The safety system as in claim 1, further comprising:

the transmission of the electronic signal is via an antenna positioned in the vicinity of driver seat of the vehicle, so that only a smart phone with the driver while in the driver seat receives the electronic signal.

9. The safety system as in claim 1, further comprising:

the safety logic receives an acknowledgment electronic signal from the mobile wireless device via the short distance wireless RF protocol of the vehicle electronics.

10. The safety system as in claim 1, further comprising:

vehicle electronics annunciates via vehicle audio system an advisory that "SMS use via by vehicle mode is operational".

11. A method for a vehicle safety system, for a vehicle driven by a driver, the vehicle safety system being adapted to selectively inhibit texting by the driver using a mobile phone, the vehicle having (i) a vehicle body that includes a driver's seat where the driver is positioned during driving of the vehicle; (ii) an ignition having an on state and an off state; and (iii) a vehicle speed system that determines a vehicle speed of the vehicle; the vehicle safety system comprising the steps of:

providing a vehicle electronics secured to the vehicle body, including in the vehicle electronic, (i) a CPU, (ii) a memory, and (iii) and a safety logic operating in a CPU and a memory of the vehicle electronics, inputting to the vehicle electronics a vehicle speed with which the vehicle is moving;

receiving periodically by the safety logic the vehicle speed and comparing by the safety logic the vehicle speed with a preset speed threshold in the memory and initiating transmission automatically by the safety logic of an electronic signal, wherein the electronic signal embeds a texting-safety digital code, via a short distance wireless transmission protocol when the vehicle speed exceeds the preset threshold, wherein confining the transmission, using a directional transmitting antenna, to an interior area of the vehicle that is occupied by the driver, and wherein, using the transmission of the electronic signal by a mobile wireless device positioned in the interior area of the vehicle that is occupied by the driver, wherein the use of the electronic signal by the mobile wireless device is without the driver interaction.

12. The method as in claim 11, further comprising the steps of:
transmitting periodically the electronic signal via a short distance wireless transmission protocol, wherein the electronic signal is in the form of a digital word, wherein, digital word is used by the mobile wireless device to effect a change of operation inside the mobile wireless device.

13. The method as in claim 11, further comprising the steps of:
transmitting periodically the electronic signal via a short distance wireless transmission protocol, wherein the electronic signal is in the form of a digital word, wherein, a plurality of bits in the digital word are set to represent the vehicle speed for use by the mobile wireless device to effect a change of operation inside the mobile wireless device.

14. The method as in claim 11, further comprising the steps of:
setting the preset speed threshold as one from a group of 0 mph, 1 mph, 2 mph, 3 mph, 4 mph, and 5 mph.

15. The method as in claim 11, further comprising the steps of:
setting the periodic transmission of the electronic signal at the rate of one from a group of, every 1 second, every 3 second, 5 sec, 7 sec and 10 sec.

16. The method as in claim 11, further comprising the steps of:
transmitting by the safety logic the electronic signal only when the vehicle electronics detects that a smart phone has been paired up with the vehicle electronics.

17. The method as in claim 11, further comprising the steps of:
transmitting the electronic signal via a one way RF antenna embedded in one of, a steering wheel, instrument panel, a dash board and a roof of the vehicle.

18. The method as in claim 11, further comprising the steps of:
positioning the antenna is in the vicinity of driver seat of the vehicle, so that only a smart phone with the driver while in the driver seat receives the digital word industry safety code.

19. The method as in claim 11, further comprising the steps of:
receiving by the safety logic an acknowledgment electronic signal from the mobile wireless device via the short distance wireless RF protocol of the vehicle electronics.

20. The method as in claim 11, further comprising the steps of:
annunciating by vehicle electronics via vehicle audio system an advisory that "SMS use via by vehicle mode is operational".

* * * * *